(12) United States Patent
Palmer

(10) Patent No.: US 8,683,218 B2
(45) Date of Patent: *Mar. 25, 2014

(54) SYSTEM AND METHOD FOR N-DIMENSIONAL ENCRYPTION

(75) Inventor: Tomas Earl Palmer, Redmond, WA (US)

(73) Assignee: Google Inc., Mountain View, CA (US)

( * ) Notice: Subject to any disclaimer, the term of this patent is extended or adjusted under 35 U.S.C. 154(b) by 1065 days.

This patent is subject to a terminal disclaimer.

(21) Appl. No.: 12/178,579

(22) Filed: Jul. 23, 2008

(65) Prior Publication Data

US 2008/0279369 A1    Nov. 13, 2008

Related U.S. Application Data

(63) Continuation of application No. 10/691,355, filed on Oct. 21, 2003, now Pat. No. 7,406,174.

(51) Int. Cl.
*G06F 21/00* (2013.01)

(52) U.S. Cl.
USPC .......................................................... 713/189

(58) Field of Classification Search
USPC ......... 713/100, 165, 167, 170, 187, 189, 193, 713/192; 711/155, 163, 205, 206, 207; 726/2, 5, 27; 380/262, 267, 268, 37, 380/28–30, 287
See application file for complete search history.

(56) References Cited

U.S. PATENT DOCUMENTS

| | | |
|---|---|---|
| 4,535,355 A | 8/1985 | Arn et al. |
| 4,694,489 A | 9/1987 | Frederiksen |
| 4,853,962 A | 8/1989 | Brockman |
| 4,972,477 A | 11/1990 | Campbell et al. |
| 5,067,035 A | 11/1991 | Kudelski et al. |
| 5,134,656 A | 7/1992 | Kudelski et al. |
| 5,144,663 A | 9/1992 | Kudelski et al. |

(Continued)

FOREIGN PATENT DOCUMENTS

| | | |
|---|---|---|
| EP | 0658054 B1 | 6/1995 |
| EP | 0714204 B1 | 5/1996 |

(Continued)

OTHER PUBLICATIONS

"Broadband Streaming: Omneon and BSkyB," Omneon Video Networks, Product Announcement, TB-1006-1, 1998, 4 pages.

(Continued)

*Primary Examiner* — Edward Zee

(74) *Attorney, Agent, or Firm* — Frommer Lawrence & Haug LLP; John W. Branch

(57) ABSTRACT

A system and method is directed to providing an n-dimensional entity for encoding and storing data securely. A user provides a cursor position within the n-dimensional entity, and a user seed to a pseudo-random number generator. The user seed may be combined with a fingerprint of a computing system in which the invention operates. The n-dimensional entity is populated with bits from the pseudo-random number generator. Bits within the n-dimensional entity are associated with actions to be performed at each cursor position. Subsequent cursor directions within the n-dimensional entity are determined using a random number generator. Plaintext is bitwise translated to a direction and an offset from the cursor position to a bit matching the plaintext bit within the n-dimensional entity. The offset is employed to modify a row of truly random bits in an encoded array.

20 Claims, 10 Drawing Sheets

(56) References Cited

U.S. PATENT DOCUMENTS

| | | |
|---|---|---|
| 5,349,681 A * | 9/1994 | Yoshida et al. ............ 712/227 |
| 5,361,081 A | 11/1994 | Barnaby |
| 5,375,168 A | 12/1994 | Kudelski et al. |
| 5,539,450 A | 7/1996 | Handelman et al. |
| 5,590,200 A | 12/1996 | Nachman et al. |
| 5,592,212 A | 1/1997 | Handelman et al. |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,878,134 A | 3/1999 | Handelman et al. |
| 5,883,957 A | 3/1999 | Moline et al. |
| 5,892,900 A | 4/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,923,666 A | 7/1999 | Gledhill et al. |
| 5,933,498 A | 8/1999 | Schneck et al. |
| 5,939,975 A | 8/1999 | Tsuria et al. |
| 5,949,876 A | 9/1999 | Ginter et al. |
| 5,982,891 A | 11/1999 | Ginter et al. |
| 5,991,399 A | 11/1999 | Graunke et al. |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,032,216 A | 2/2000 | Schmuck et al. |
| 6,035,037 A | 3/2000 | Chaney |
| 6,038,433 A | 3/2000 | Vegt et al. |
| 6,049,671 A | 4/2000 | Slivka et al. |
| 6,055,503 A | 4/2000 | Horstmann |
| 6,064,737 A | 5/2000 | Rhoads |
| 6,073,256 A | 6/2000 | Sesma |
| 6,112,181 A | 8/2000 | Shear et al. |
| 6,157,721 A | 12/2000 | Shear et al. |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,219,421 B1 | 4/2001 | Backal |
| 6,226,794 B1 | 5/2001 | Anderson, Jr. et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,774 B1 | 9/2001 | Schumann et al. |
| 6,285,985 B1 | 9/2001 | Horstmann |
| 6,298,441 B1 | 10/2001 | Handelman et al. |
| 6,314,409 B2 | 11/2001 | Schneck et al. |
| 6,314,572 B1 | 11/2001 | LaRocca et al. |
| 6,334,213 B1 | 12/2001 | Li |
| 6,377,261 B1 | 4/2002 | Fernandez et al. |
| 6,381,341 B1 | 4/2002 | Rhoads |
| 6,389,402 B1 | 5/2002 | Ginter et al. |
| 6,405,369 B1 | 6/2002 | Tsuria et al. |
| 6,409,080 B2 | 6/2002 | Kawagishi et al. |
| 6,409,089 B1 | 6/2002 | Eskicioglu |
| 6,445,797 B1 | 9/2002 | McGough |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,549,563 B1 * | 4/2003 | McDonough ............ 375/140 |
| 6,587,561 B1 | 7/2003 | Sered et al. |
| 6,606,746 B1 | 8/2003 | Zdepski et al. |
| 6,629,243 B1 | 9/2003 | Kleinman et al. |
| 6,634,028 B2 | 10/2003 | Handelman et al. |
| 6,651,170 B1 | 11/2003 | Rix et al. |
| 6,654,420 B1 | 11/2003 | Snook et al. |
| 6,654,423 B2 | 11/2003 | Jeong et al. |
| 6,708,250 B2 | 3/2004 | Gillingham et al. |
| 6,904,110 B2 | 6/2005 | Trans et al. |
| 7,205,912 B1 | 4/2007 | Yang et al. |
| 7,362,781 B2 * | 4/2008 | Rhoads ............ 370/522 |
| 7,406,174 B2 * | 7/2008 | Palmer ............ 380/28 |
| 2002/0001385 A1 | 1/2002 | Kawada et al. |
| 2002/0015498 A1 | 2/2002 | Houlberg et al. |
| 2002/0021805 A1 | 2/2002 | Schumann et al. |
| 2002/0089410 A1 | 7/2002 | Janiak et al. |
| 2002/0104004 A1 | 8/2002 | Couillard |
| 2002/0141582 A1 | 10/2002 | Kocher et al. |
| 2003/0007568 A1 | 1/2003 | Hamery et al. |

FOREIGN PATENT DOCUMENTS

| | | |
|---|---|---|
| EP | 0886409 A2 | 12/1998 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO-01/93212 A2 | 12/2001 |
| WO | WO-02/21761 A2 | 3/2002 |

OTHER PUBLICATIONS

"Establishing Interconnectivity Among Various Makers' Products Through Standardization of VOD Protocol," NTT Corporation Press Release, Sep. 27, 2002, http://www.ntt.co.jp/news/news02e/0209/020927.html.

"Irdeto Access and Optibase Create Strategic Alliance—Dec. 14, 2000," Press Release Irdeto Access, Dec. 14, 2000, 4 pages, http://www.irdetoaccess.com/press/0000041.htm.

"Irdeto Access and Optibase Create Strategic Alliance", Press Release, Optibase, Dec. 14, 2000, 2 pages, http://www.optibase.com/html/news/December_14_2000.html (accessed Nov. 13, 2003).

Bathtrop, Justin, et al., "Coverage and Generalization in an Artificial Immune System," Proceedings of Genetic and Evolutionary Computation Conference (GECCO), 2002, 8 pages.

Blumenfeld, Steven M., "System Security," Broadcast Engineering magazine, Oct. 2001, 2 pages.

Cheng, Howard Chi Ho, "Partial Encryption for Image and Video Communication," Department of Computing Science, University of Alberta, Master's Thesis, Fall 1998, 94 pages.

Eskicioglu, A. et al., "An Overview of Multimedia Content Protection in Consumer Electronics Devices," Signal Processing: Image Communication, Apr. 2001, 16(7):681-699.

Forrest, S., "Research Projects," Dec. 2, 2003, 3 pages, http://www.cs.unm.edu/~forrest/projects.html.

Goonatilake, S. et al., *Intelligent Systems for Finance and Business* (John Wiley & Sons Ltd) 1995, chapters 2-10, pp. 31-173.

Griwodz, Carsten et al., "Video Protection by Partial Content Corruption," Multimedia and Security Workshop at ACM Multimedia, Bristol, UK, Sep. 1998, 5 pages.

Hunter, Jane et al., "A Review of Video Streaming Over the Internet," DSTC Technical Report TR97-10, Aug. 1997, 28 pages.

Schulzrinne, H. et al., "Real Time Streaming Protocol (RTSP)," RFC 2326, Apr. 1998, 86 pages (accessed Mar. 30, 2004).

Spanos, George et al., "Performance Study of a Selective Encryption Scheme for the Security of Networked, Real-Time Video," Proceedings of the 4th International Conference on Computer Communications and Networks, Las Vegas, NV, Sep. 1995, pp. 2-10.

Wu, Tsung-Li et al., "Selective Encryption and Watermarking of MPEG Video," International Conference on Image Science, Systems, and Technology, CISST'97, Sep. 1997, 10 pages.

Yoshida, Kazuhiro, et al., "A Continuous-media Communication Method for Minimizing Playback Interruptions," IS&T/SPIE Conference on Visual Communications and Image Processing, San Jose, California, Jan. 1999, SPIE vol. 3653, pp. 748-757.

"Telestream and Omneon Team Up to Stream Soccer for BSkyB", Press Release Archives, IBC Show, Amsterdam, Netherlands, Sep. 13, 2001, 2 pgs.

* cited by examiner

Fig. 4.

| EXAMPLE OF OPCODES AND ASSOCIATED ACTIONS ||
|---|---|
| OP_JMP_X_USING NEXT_8_BITS_X, | Read the next 8 bits along the X plane. Use the bits read as the number of bits to move the Cursor along the X plane |
| OP_JMP_X_USING NEXT_8_BITS_Y, | Read the next 8 bits along the Y plane. Use the bits read as the number of bits to move the Cursor along the X plane |
| OP_JMP_X_USING NEXT_8_BITS_Z, | Read the next 8 bits along the Z plane. Use the bits read as the number of bits to move the Cursor along the X plane |
| OP_JMP_Y_USING NEXT_8_BITS_X, | Read the next 8 bits along the X plane. Use the bits read as the number of bits to move the Cursor along the Y plane |
| OP_JMP_Y_USING NEXT_8_BITS_Y, | Read the next 8 bits along the Y plane. Use the bits read as the number of bits to move the Cursor along the Y plane |
| OP_JMP_Y_USING NEXT_8_BITS_Z, | Read the next 8 bits along the Z plane. Use the bits read as the number of bits to move the Cursor along the Y plane |
| OP_JMP_Z_USING NEXT_8_BITS_X, | Read the next 8 bits along the X plane. Use the bits read as the number of bits to move the Cursor along the Z plane |
| OP_SWAP_XY, | Swap the X cursor position with the Y cursor position |
| OP_SWAP_XZ, | Swap the X cursor position with the Z cursor position |
| OP_SWAP_YZ, | Swap the Y cursor position with the Z cursor position |
| OP_OPPOSITE_X, | All subsequent X cursor jumps are to move toward zero. |
| OP_OPPOSITE_Y, | All subsequent Y cursor jumps are to move toward zero. |
| OP_OPPOSITE_Z, | All subsequent Z cursor jumps are to move toward zero. |
| OP_NOT_CUBE | Every ON bit in the Entity is to be treated as an OFF bit and every OFF bit is to be treated as an ON bit |

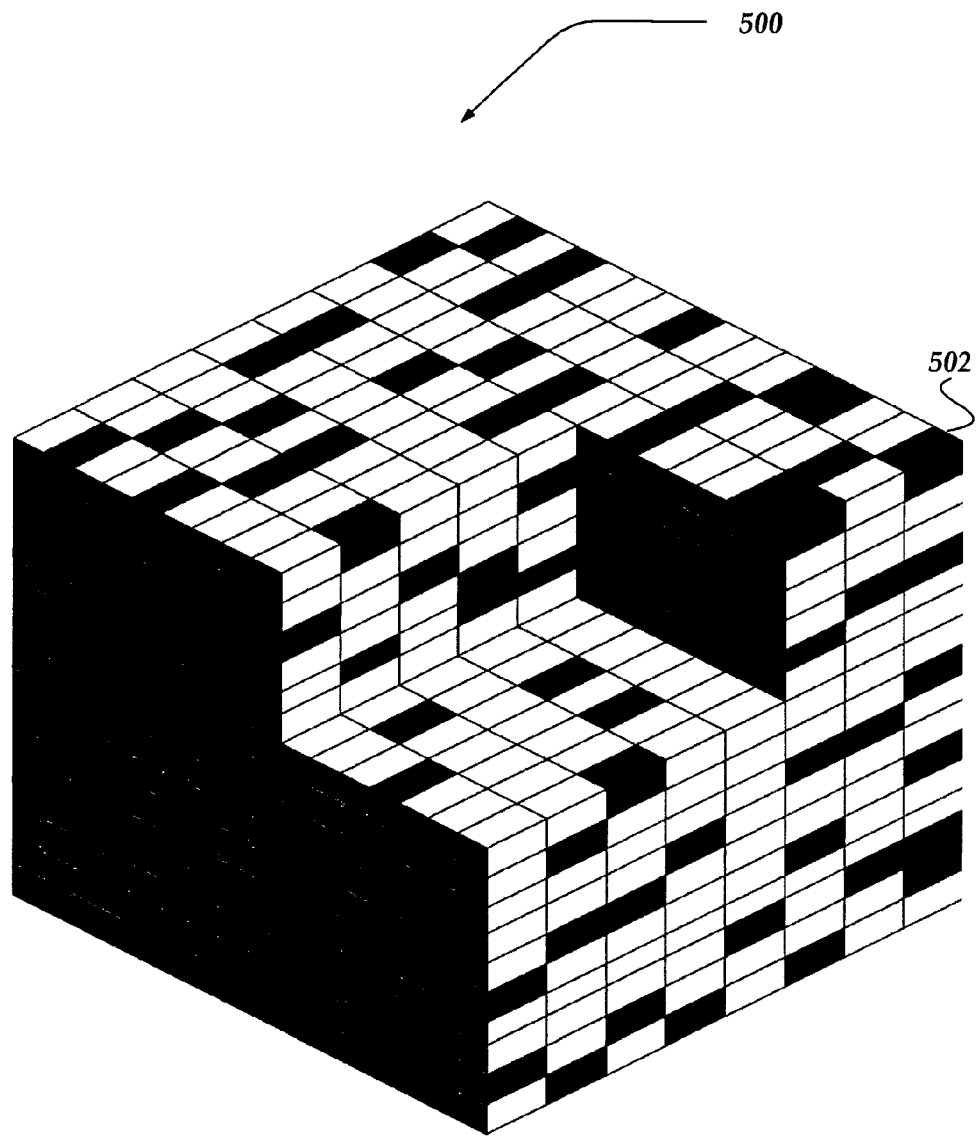
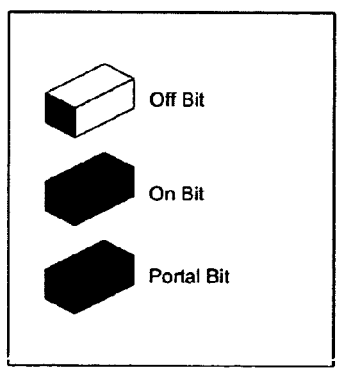
*Fig. 5.*

SYSTEM AND METHOD FOR N-DIMENSIONAL ENCRYPTION

CROSS-REFERENCE TO RELATED APPLICATION

This utility patent application is a continuation U.S. patent application Ser. No. 10/691,355 filed on Oct. 21, 2003, and entitled "System And Method For N-Dimensional Encryption," the benefit of which is claimed under 35 U.S.C. §120, and which is incorporated herein by reference.

TECHNICAL FIELD

The present invention relates to data security and in particular to a method and system for encoding and storing data securely using an n-dimensional entity.

BACKGROUND

A major problem in securing any computing system is determining a safe place to store and hide sensitive information. No matter how many 'lockboxes' are wrapped around this information, one is often still left with the problem of hiding the master key to the outermost lockbox.

It is generally accepted that a safe place to hide this master key is somewhere other than on the system being secured. This is exemplified by the use of smart cards, remote key servers, and the like, for securing the system that contain the master key. However, such approaches remain problematic where there is no remote storage mechanism available.

Storing the master key on the same computing system that it secures, also introduces numerous security concerns. Because, no current hiding place is perfectly secure, anything saved in a persistent store on the same computing system can be located, and hence is vulnerable to analysis, and attack. For example, many computer systems have at least one user that has super-user, or other administrative privileges, which makes many operating system security approaches ineffective for hiding the master key. Moreover, a persistent store and supporting code may be moved from one computing system to another, making it readily available to a hacker. Additionally, a hacker may repeatedly send data to traditional encryption tools that one may employ to secure the master key. In this manner, one may dynamically determine how the master key is secured, making such encryption tools even less effective. Therefore, there is a need in the industry for a method and system for protecting the master key, and similar sensitive information. Thus, it is with respect to these considerations, and others, that the present invention has been made.

SUMMARY

The present invention is directed to addressing the above-mentioned shortcomings, disadvantages and problems, and will be understood by reading and studying the following specification.

The present invention provides a system and method directed to encoding and storing data securely using an n-dimensional entity. The n-dimensional entity is initially populated with bits from a pseudo-random number generator. Plaintext is bitwise translated to a direction and offset from a current cursor position to a bit meeting the "match" criteria with the plaintext bit within the n-dimensional entity. A match may be state driven such that an ON bit in the plaintext may be matched to an OFF bit in the n-dimensional entity, and so forth, depending on the state set by a preceding op-code action. Subsequent cursor directions within the n-dimensional entity are determined using a true random number generator. The resulting output is an encoded array that may be further obfuscated by combining the output with corresponding elements in an obfuscation table.

In one aspect of the invention, a method is directed to encrypting a data string. An n-dimensional entity is generated that comprises random bits. For each bit in the data string, a number of bits are read from the n-dimensional entity. An action is performed that is based in part on the read number of bits. A bit sequence is generated, and a direction within the n-dimensional is selected based in part on the generated bit sequence. An offset is determined between a cursor position and a match bit within the n-dimensional entity. The match bit is based in part on the action, the direction, and the each bit in the data string. The determined offset is then employed to modify the generated bit sequence to generate an encoded data string.

In another aspect of the invention, a method is directed to encrypting a data string. An n-dimensional entity is generated that is populated with pseudo-random bits. For each bit in the data string, a cursor position, and a direction within the n-dimensional entity is determined. A number of bits are determined by reading bits from the n-dimensional entity from the determined cursor position along the determined direction. An action is performed that is based in part on the determined number of bits. A bit sequence is generated and another direction is selected that is based in part on the bit sequence. An offset is determined between a match bit within the n-dimensional entity and the cursor position. The match bit is based in part on the action, the other direction, and the each bit in the data string. The offset is employed to modify the bit sequence to generate an encoded data string for each bit in the data string.

In still another aspect of the invention, a system is directed to encrypting a data string. The system includes an entity generator and a mapper. The entity generator is arranged to generate an n-dimensional entity. The mapper is arranged to receive the n-dimensional entity and perform actions. The mapper receives the data string. For each bit in the data string, the mapper reads a number of bits from the n-dimensional entity and performs an action based in part on the read number of bits. The mapper also generates a bit sequence for each bit in the data string, and selects a direction within the n-dimensional entity based in part on the generated bit sequence. The mapper further determines an offset between a cursor position and a match bit within the n-dimensional entity. The match bit is based in part on the action, the direction, and the each bit in the data string. Additionally, the mapper modifies the generated bit sequence with the determined offset to generate an encoded data string.

In yet another aspect of the invention, an apparatus is directed to encrypting a data string. The apparatus includes a transceiver and an n-dimensional encrypter. The transceiver receives the data string and sends an encoded array. The n-dimensional encrypter is coupled to the transceiver and is arranged to perform actions. The n-dimensional encrypter generates an n-dimensional entity that is comprised of random bits. For each bit in the received data string, the n-dimensional encrypter reads a number of bits from the n-dimensional entity, and performs an action associated with the read number of bits. The n-dimensional encrypter also generates a bit sequence and selects a direction within the n-dimensional entity based in part on the generated bit sequence, for each bit in the received data string. Moreover, the n-dimensional encrypter determines an offset between a cursor position and a match bit within the n-dimensional entity. The match bit is based in part on the action, the direction, and the each bit in the received data string. Modifying the generated bit sequence with the determined offset generates an encoded data string. The encoded data string represents a row within the encoded array.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIG. 4 illustrates one embodiment of a table of op-codes and associated actions for use with the n-dimensional entity;

FIG. 5 illustrates one embodiment of a three-dimensional entity (cube) populated with pseudo-random bits;

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "coupled" and "connected" include a direct connection between the things that are connected or an indirect connection through one or more either passive or active intermediary devices or components.

The terms "comprising," "including," "containing," "having," and "characterized by," include an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed towards a system and method of encoding and storing data securely using an n-dimensional entity. A user provides a cursor position within the n-dimensional entity, and a user seed to a pseudo-random number generator. The user seed may be combined with a fingerprint of a computing system in which the invention operates. The n-dimensional entity may be populated with bits from the pseudo-random number generator. Bits within the n-dimensional entity are associated with op-code actions to be performed at each cursor position. Plaintext is then bitwise translated to a direction and an offset from the cursor position to a bit matching the plaintext bit within the n-dimensional entity. The offset is employed to modify a row of truly random bits within an encoded array. Subsequent cursor directions within the n-dimensional entity may be determined using the true random number generator. The output is the encoded array, which may be further obfuscated by, among other way, exclusive or-ing it with corresponding elements in an obfuscation table. The plaintext may be recovered by decoding the encoded array using the original user seed, cursor position within the n-dimensional entity, and fingerprint.

Illustrative Operating Environment

Figure 1:
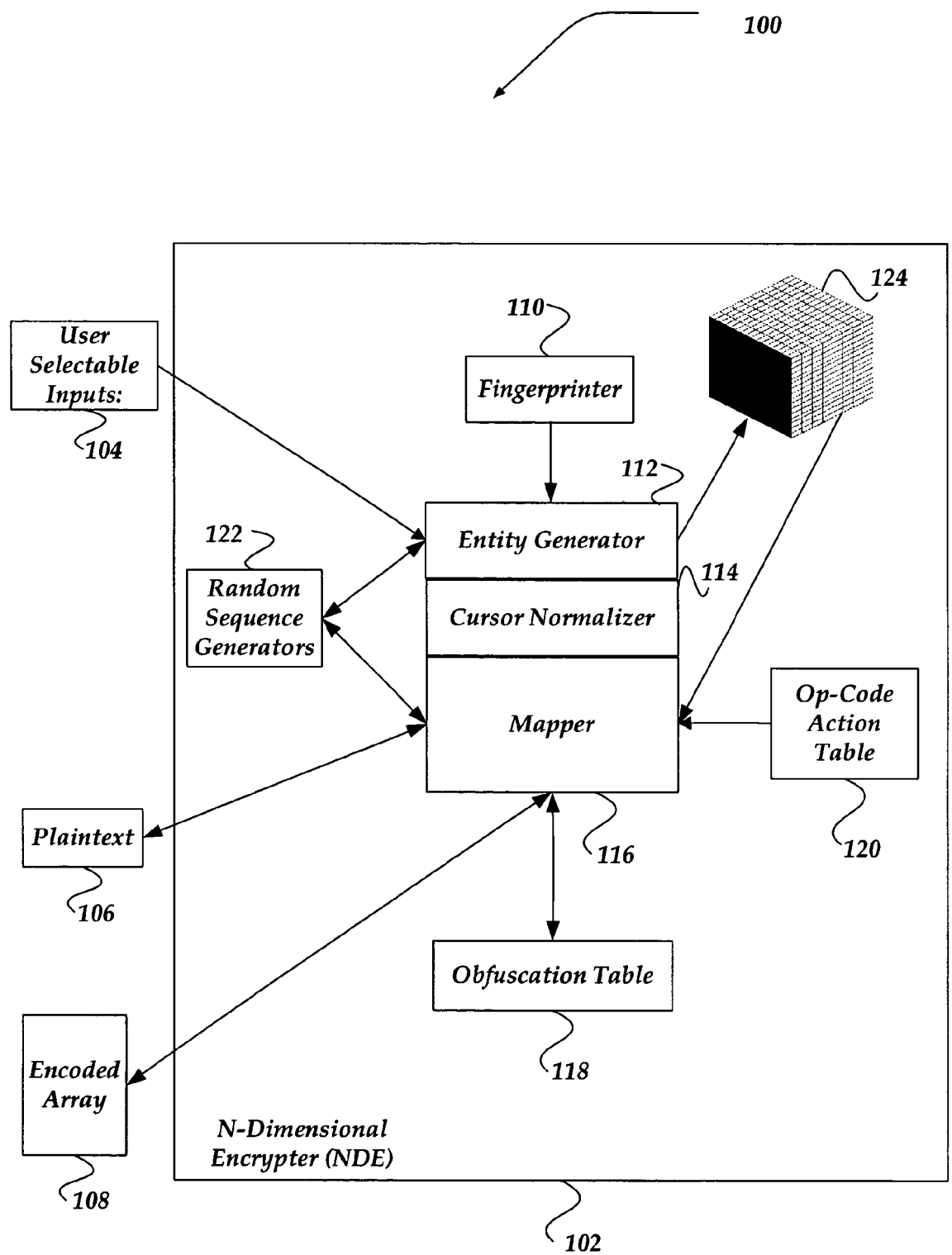
FIG. 1 illustrates one embodiment of components of an n-dimensional encryption system.

FIG. 1 illustrates one embodiment of components of an n-dimensional encryption system. System 100 may include many more, or less, components than those shown, however, those shown are sufficient to disclose an illustrative embodiment for practicing the invention.

As shown in the figure, system 100 includes n-dimensional encrypter (NDE) 102, user selectable inputs 104, plaintext 106, and encoded array 108. N-dimensional encrypter 102 includes fingerprinter 110, entity generator 112, cursor normalizer 114, mapper 116, obfuscation table 118, op-code action table 120, random sequence generators 122, and n-dimensional entity 124.

Entity generator 112 is in communication with user selectable inputs 104, cursor normalizer 114, fingerprinter 110, n-dimensional entity 124, and random sequence generators 122. Mapper 116 is in communication with plaintext 106, cursor normalizer 114, random sequence generators 122, op-code action table 120, obfuscation table 118, n-dimensional entity 124, and encoded array 108.

User selectable inputs 104 include, but are not limited to, a user seed, a cursor position within n-dimensional entity 124, a default op-code size, plane direction, and the like. The cursor position may be input in a variety of configurations, including coordinate positions within n-dimensional entity 124. For example, the cursor position may include an X, Y, and Z coordinate position within the n-dimensional entity, where the dimension, n, is three.

The user selectable inputs 104 may also include a starting op-code that is configured to set a portal bit (start bit) within n-dimensional entity 124. The starting op-code may be employed as a first action within n-dimensional entity 124.

User selectable inputs 104 may be provided to NDE 102 employing virtually any mechanism, including a keyboard, mouse, voice activation, touch-screen, another program, and the like.

Plaintext 106 includes virtually any data string that is to be encrypted. In one embodiment, plaintext 106 further includes information as to the length, in bits, of the data string to be encrypted. In another embodiment, the length of plaintext 106 is determined from plaintext 106 by entity generator 112.

Encoded array 108 is described in more detail below in conjunction with FIG. 3. Briefly, however, encoded array 108 represents the results of encoding plaintext 106 using NDE 102. Encoded array 108 is an M by S array, where M is the number of rows, and S is the number of columns.

Fingerprinter 110 is configured to generate a fingerprint based in part on one or more unique and/or identifiable elements associated with the computing system in which the present invention operates. Examples of such elements include, but are not limited to, a Central Processing Unit's (CPU's) kernel calculated speed, CPU serial number, CPU family identity, CPU manufacturer, an operating system globally unique identifier (GUID), hardware component enumerations, Internet Protocol (IP) address, BIOS serial number, disk serial number, kernel version number, operating system version number, operating system build number, machine name, installed memory characteristic, physical port enumeration, customer supplied ID, MAC address, and the like.

Fingerprinter 110 may convert one or more of the unique and/or identifiable elements into a digest employing a hashing mechanism. Each digest may again be hashed to provide the single fingerprint. Fingerprinter 110 may employ any of a variety of hashing mechanisms including, but not limited to, Message Digests (MD), Secure Hash Algorithms (SHA), and the like. In one embodiment, SHA-1 is employed to generate the fingerprint.

Fingerprinter 110 is further configured to provide the fingerprint to entity generator 112. In one embodiment, entity generator 112 is configured to employ the fingerprint to seed a pseudo-random number generator, such as included within random sequence generators 122.

Random sequence generators 122 include a true random number generator (tRAND), and one or more pseudo-random number generators (PRANDs (1-P)). PRANDs (1-P) may be configured to provide one or more pseudo-random sequences to entity generator 112 for use in the generation of deterministic elements, such as n-dimensional entity 124, and the like. TRAND may be configured to enable a determination of a random cursor movement within n-dimensional entity 124 during an encoding phase. TRAND may also be configured to generate a truly random sequence for use in populating encoded array 108.

TRAND may be configured to provide a sequence of bits that are considered to be statistically truly random. In one embodiment, tRAND is dependent on the computing system in which the present invention operates. In another embodiment, tRAND operates as an entropy pool seeded at a provisioning time, and updated from a time/entropy server. Output of the time/entropy server may include digitally signed and encrypted packets that are received by random sequence generators 122.

In one embodiment, the entropy pool is updated by passing the contents of the current entropy pool and an entropy seed that is read every time an update is invoked. This may be done numerous times and an entropy value is generated from the unsigned number of bits in the entropy pool. The entropy pool is the result of the current entropy pool seed being hashed using any of a variety of hashing mechanisms, including SHA-1, with the current contents of the entropy pool. Each entropy seed is created by any of a variety of mechanisms. In one embodiment, each entropy seed is created by multiplying an internal CPU counter by an operating system time and securely hashing the results. This is repeated sixteen times.

Entropy sources may include, but are not limited to, disk latency, floating TTL lines at a port, a keystroke delta, and the like. In one embodiment, the system does not include a true entropy source.

PRANDs (1-P) may include virtually any random number generator having an output that is statistically deterministic. PRANDs (1-P) may be implemented using hardware, software, and a combination of hardware and software. In one embodiment, random sequence generators 122 include two pseudo-random number generators, pRAND1, and pRAND2.

PRANDs (1-P) may be seeded independent from each other. PRANDs (1-P) may also be seeded employing values derived in part from fingerprinter 110 in combination with the user seed. By seeding pRANDs (1-P) in this manner the generated series of random numbers may be made unique to the computing system in which the present invention operates and to a particular user. Although such uniqueness is not necessary to the success of the present invention, it does provide another level of obfuscation and a simple mechanism for binding the structure of the present invention to a single computing system.

Op-code action table 120 is described in more detail in conjunction with FIG. 4. Briefly, however, op-code action table 120 includes an op-code that maps bits within n-dimensional entity 124 to an action to be taken upon its structure. The size and meaning of the op-code are typically implementation specific.

Although, op-code action table 120 may be implemented as a table, it is not so limited. For example, op-code action table 120 may also be implemented as a list, a linked-list, a database, a program, and the like.

Obfuscation table 118 includes an element for each of the possible op-codes within op-code action table 120. Obfuscation table 118 may be populated with random numbers generated through pRANDs (1-P). In one embodiment, pRAND2 is employed to provide the random numbers. It is noted that obfuscation table 118 is optional and need not be included.

N-dimensional entity 124 represents an n-dimensional array of pseudo-random bits, where N may be any integer value greater than zero. N-dimensional entity 124, typically, does not hold any information about plaintext 106. Rather, n-dimensional entity 124 is configured to enable the generation of encoded array 108, for plaintext 106.

To simplify illustrations, n-dimensional entity 124 is shown as a cube. FIG. 5 illustrates one embodiment of a three-dimensional entity (cube) populated with pseudo-random bits. As shown in FIG. 5, bits within the cube may be set to a high value (ON), a low value (OFF), and the like. For example, as shown in the figure, bit 502 is set ON. The present invention however, is not limited to bi-state values for bits within the n-dimensional entity. As such, other levels of states may be employed without departing from the scope of the present invention.

The length (number of bits) of each dimension of n-dimensional entity 124 may be derived in part by employing a random number generated by pRANDs (1-P). In one embodiment, the generated random number is constrained by modulus arithmetic.

Because a very large length for a dimension of n-dimensional entity 124 may adversely affect performance of some slower computing systems, a maximum length may be desired. If a maximum length is desired, it may be determined through any of a variety of engineering approaches that enable tuning of the length for a given computing system. In one embodiment, the length of each dimension is limited to 1K bits.

Moreover, although not required, it may also be desirable to have the overall size of n-dimensional entity 124 to be no larger than a natural size of a CPU integer. Thus, in one embodiment, the size of n-dimensional entity 124 is 32 bits.

N-dimensional entity 124 need not be generated completely at any given time. For example in one embodiment, n-dimensional entity 124 is generated such that bits that are under, or within a defined region, such as around the cursor position, are generated at any one time. In one embodiment, the cursor position may be converted into a count of the number of pseudo-random numbers that are to be employed to substantially the same view under the cursor position, as there would be had n-dimensional entity 124 been fully generated.

Entity generator 112 is configured to generate at least a portion of n-dimensional entity 124. Entity generator 112 may employ process 700 described below in conjunction with FIG. 7 to generate n-dimensional entity 124.

Entity generator 112 may employ user selectable inputs 104, and the fingerprint generated by fingerprinter 110 to seed one or more pRANDs (1-P). The output of at least one of pRANDs (1-P) may also be employed by entity generator 112 to determine the dimension and lengths of n-dimensional entity 124. Entity generator 112 may further employ at least one of pRANDs (1-P) to populate n-dimensional entity 124 with pseudo-random bits.

Cursor normalizer 114 is configured to receive user selectable inputs 104, including a cursor position, and ensure that the cursor position resides within the boundaries of n-dimensional entity 124. For example, a cursor position might specify an X-position of 55; however, the X-length for n-dimensional entity 124 may only be 30 bits. Therefore, cursor normalizer 114 normalizes the cursor position to within the 30 bits of length for the example n-dimensional entity. Normalization may be performed employing any of a variety of mechanisms, including truncating the cursor position, mapping the cursor position around a given plane of n-dimensional entity 124, and the like. In one embodiment, a cyclical redundancy check (CRC) is applied to each plane of the cursor position to reduce the number of bits to be normalized. The obtained CRC values for each plane are adjusted employing a circular orbiting algorithm, or the like, until each component of the cursor position is within the boundaries of n-dimensional entity 124. Circular orbiting of n-dimensional entity 124 multiple times may be permissible. For example, normalization may include wrapping the cursor position around n-dimensional entity 124 in an order of dimension, such as X to Y, Y to Z, Z to X, and the like, until the cursor bits to move are exhausted. Moreover, circular orbiting may include orbiting X dimension twice, then moving to Z, then back to X, then to Y three times, and so forth.

Mapper 116 is configured to generate encoded array 108 from plaintext 106. Mapper 116 may perform actions such as described below in conjunction with FIG. 8 to generate encoded array 108. Note that preceding actions may also modify actions performed by mapper 116. Hence, it may be possible that an op-code in op-code action table 120 may mean employ an op-code action table other than op-code action table 120 (not shown), and the like. The op-code may also mean that until instructed otherwise, from now on, subtract one from every op-code and execute the resulting associated action.

Mapper 116 may, for example, employ, among other components, op-code action table 120, and n-dimensional entity 124 to bitwise translate plaintext 106 to a direction and an offset from a cursor position to a bit matching the plaintext bit within the n-dimensional entity 124. Mapper 116 may employ the offset to modify each row within encoded array 108. Mapper 116 may further employ obfuscation table 118 to further obfuscate encoded array 108.

Mapper 116 also may be configured to generate plaintext 106 based in part on the decoding of encoded array 108. Mapper 116 may perform actions such as described below in conjunction with FIG. 10 to generate plaintext 106.

Although entity generator 112, cursor normalizer 114, and mapper 116 are illustrated as three distinct components, the present invention is not so limited. For example, entity generator 112, cursor normalizer 114, and mapper 116 may operate within a single component, several components, any combination of components, and a different arrangement of components, and the like, without departing from the scope of the present invention.

Illustrative Computing Environment

Figure 2:
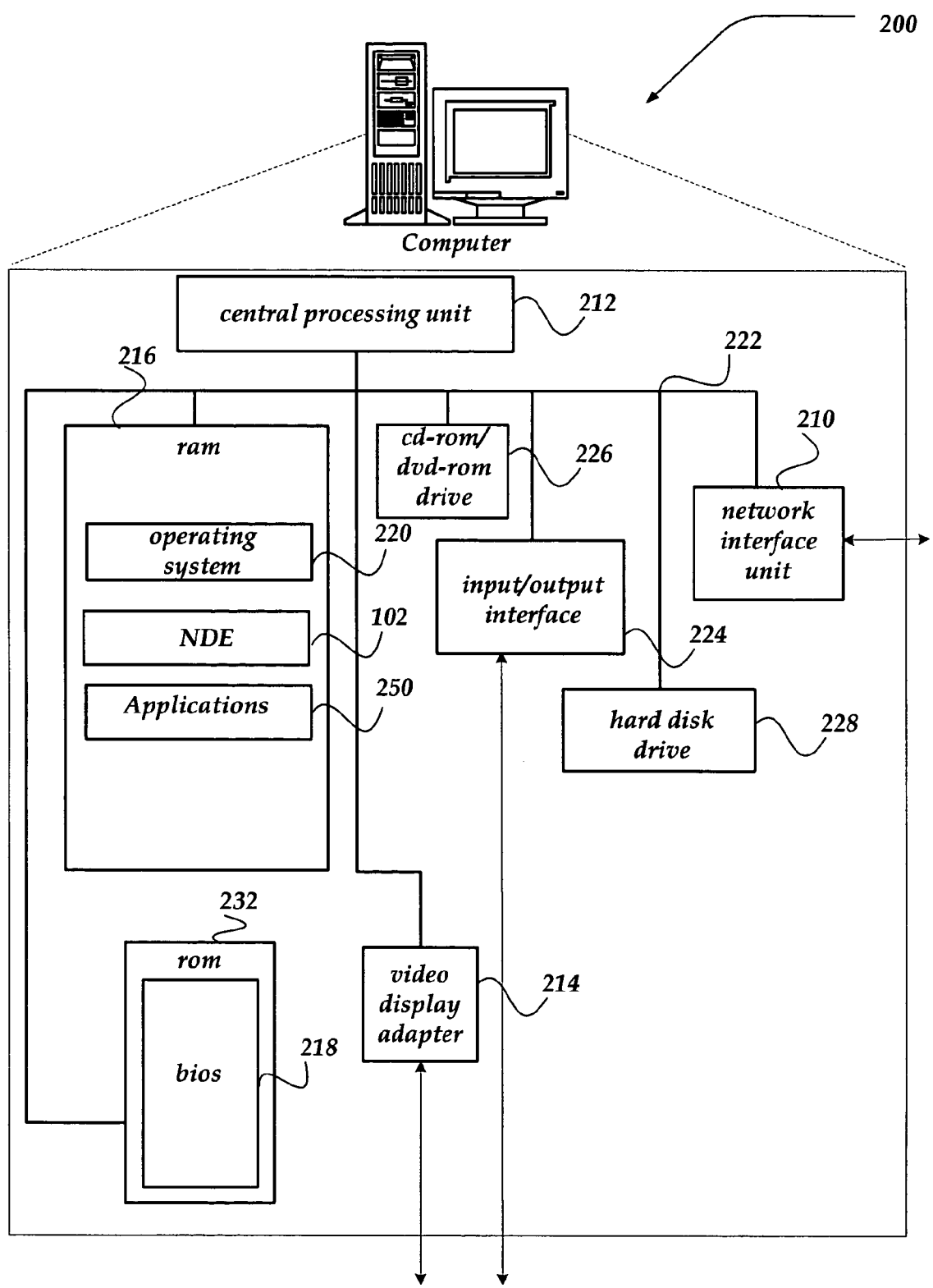
FIG. 2 illustrates an exemplary environment in which the present invention may be practiced.

FIG. 2 shows an exemplary computer 102 that may be included in a system implementing the invention, according to one embodiment of the invention. Computer 102 may include many more components than those shown. The components shown, however, are sufficient to disclose an illustrative embodiment for practicing the invention.

Computer 102 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of computer 102. Any general-purpose operating system may be employed. Basic input/output system ("BIOS") 218 is also provided for controlling the low-level operation of computer 102.

As illustrated in FIG. 2, computer 102 also can communicate with the Internet, or some other communications network, such as network 104 in FIG. 1, via network interface unit 210, which is constructed for use with various communication protocols including the TCP/IP protocol. Network interface unit 210 is sometimes known as a transceiver or transceiving device.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

In one embodiment, the mass memory stores program code and data for implementing operating system 220. The mass memory may also store additional program code and data for performing the functions of network device 200, and NDE 102. One or more applications 250, NDE 102, and the like, may be loaded into mass memory and run on operating system 220.

Computer 102 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion.

Computer 102 also includes input/output interface 224 for communicating with external devices, such as a mouse, keyboard, scanner, or other input devices not shown in FIG. 2. Likewise, computer 102 may her include additional mass storage facilities such as CD-ROM/DVD-ROM drive 226 and hard disk drive 228. Hard disk drive 228 is utilized by computer 102 to store, among other things, application programs, databases, encoded array 108 of FIG. 1, NDE 102, and the like.

In one embodiment, n computer systems, substantially similar to computer 102, may share data from computer 102, where each n-dimensional entity provides a seed, starting cursor position, and the like. In this embodiment, n end-users may be required with proper keys before data may be encrypted/decrypted.

Figure 3:
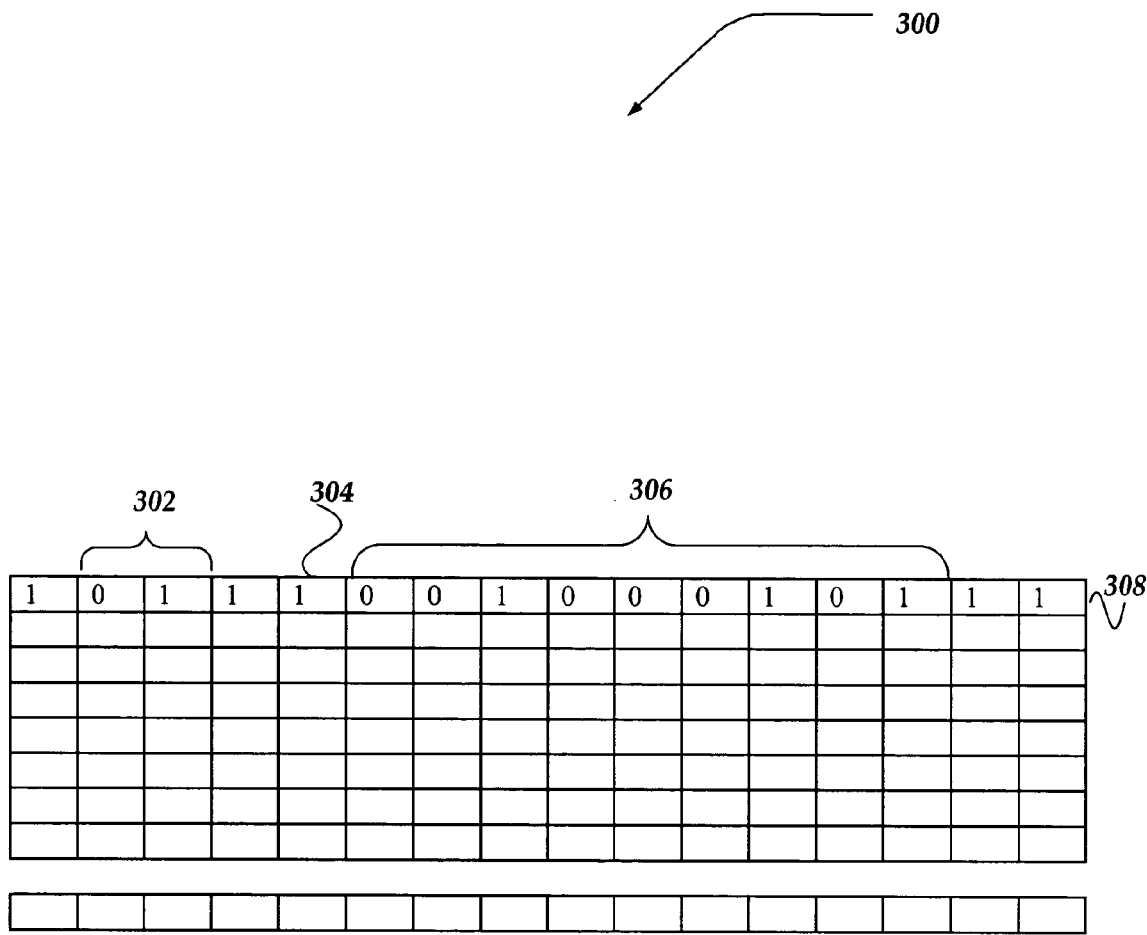
FIG. 3 illustrates one embodiment of an encoded array.

FIG. 3 illustrates one embodiment of an encoded array, such as encoded array 108 of FIG. 1. Encoded array 300 is an M by S array, where M is the number of rows and S is the number of columns. In one embodiment, M is equal to the length of plaintext 106 of FIG. 1, and S is equal to the length of an op-code. However, the invention is not so limited. For example, the number of row and/or columns may be extended to further obfuscate encoded array 300.

As shown in FIG. 3, each row, such as row 308, includes PLANE-MEMBER bits 302, NEW-ENTITY bit 304, and OFFSET bits 306. Such bits may be arranged within row 308 in virtually any sequence, location, and the like.

PLANE-MEMBER bits 302 represent a direction within n-dimensional entity of FIG. 1. For example, PLANE-MEMBER bits 302 may represent a north, south, east, west, near, far direction, and the like. PLANE-MEMBER bits 302 may also represent an X, Y, Z planar direction, angular direction, and the like.

NEW-ENTITY bit 304 indicates whether the n-dimensional entity is regenerated during a given encoding action for the current row within encoded array 300.

OFFSET bits 306 represent a count of bits between a cursor position within the n-dimensional entity, along the direction indicated by PLANE-MEMBER bits 302, to a bit that matches the current bit within plaintext 106 of FIG. 1.

FIG. 4 illustrates one embodiment of a table of op-codes and associated actions for use with the n-dimensional entity. As shown in the figure, table 400 includes op-codes 402 and associated actions 404. Op-codes 402 typically represent a sequence of bits that may be read from the n-dimensional entity. The number of bits read is equal to the size of an op-code within op-codes 402. In one embodiment, the size of an op-code is 16 bits.

Op-codes 402 and their associated actions 404 may be uniquely and randomly generated for each encoding session. The sequence of bits representing an op-code may be generated to be deterministic, non-deterministic, or a combination of deterministic and non-deterministic. Generation of op-codes 402 may be performed using pRANDs (1-P), tRAND, and that like. Moreover, the random number generator pRAND, tRAND) may be reseeded at various intervals during an encoding session. In one embodiment, the various intervals are selected randomly.

The sequence of bits representing an op-code is employed as an index into table 400, to locate associated action 404. The located associated action 404 may result in a new cursor position, switching bit state to search for within the n-dimensional entity, changing the direction within the n-dimensional entity, and the like. For example, op-code 406 results in the action of "reading the next eight bits along the X direction within the n-dimensional entity." Additionally, the number of bits read is "employed to move the cursor position along the X direction."

Table 400 is merely an example of op-codes and associated actions. It is not intended to illustrate a complete set of all possible op-codes, associated actions, and the like. Other op-codes and associated actions may therefore, be employed without departing from the scope of the present invention.

Moreover, table 400 need not be implemented as a table. For example, table 400 may be implemented as a database, a linked-list, a computer program, in hardware, and the like, without departing from the scope of the present invention.

Illustrative Operation for Replicating Content

Figure 6:
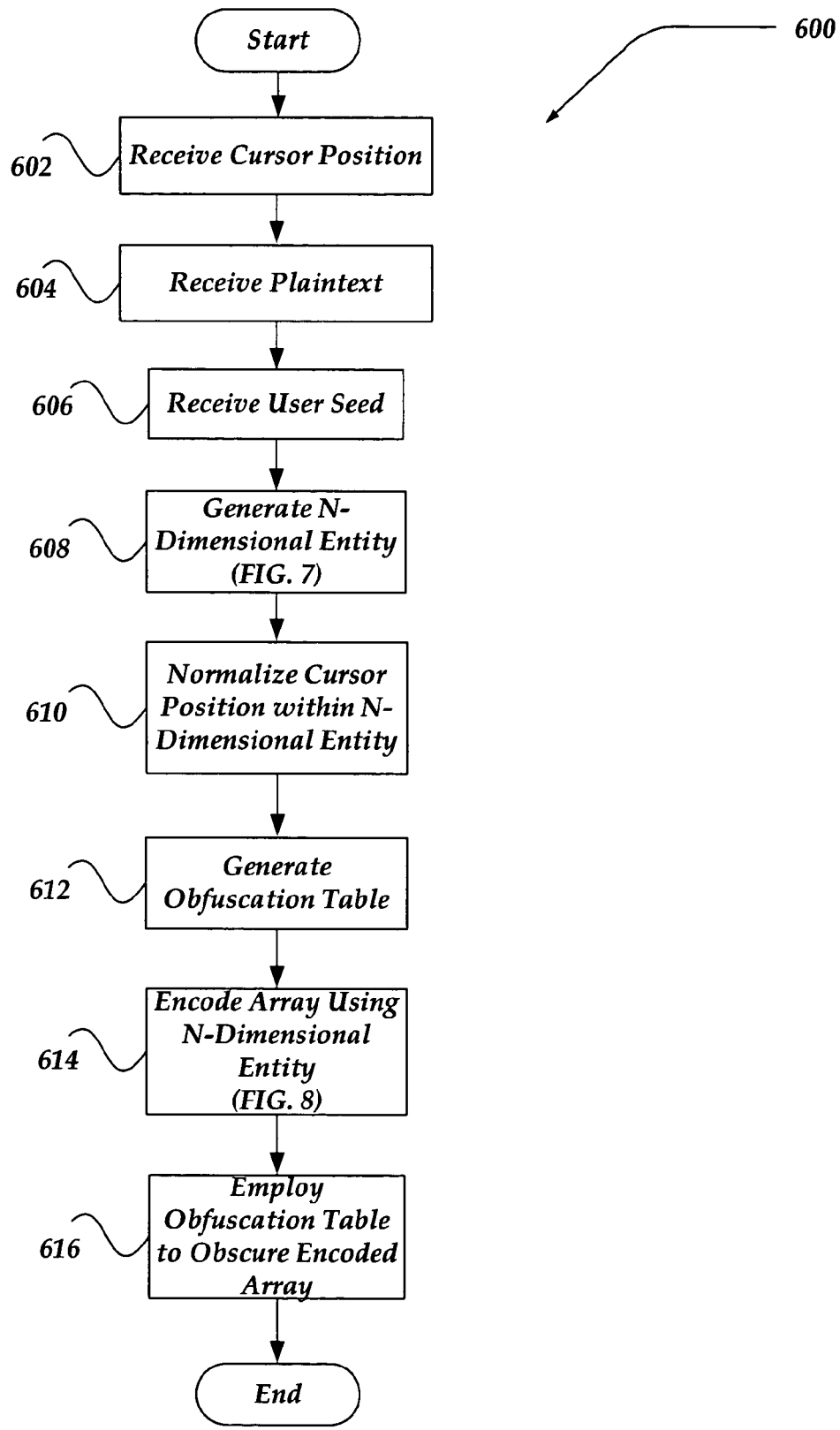
FIG. 6 illustrates a flow diagram generally showing one embodiment for a process of encrypting a data string.

The operation of certain aspects of the present invention will now be described with respect to FIGS. 6-10. FIG. 6 illustrates a flow diagram generally showing one embodiment for a process of encrypting a data string, such as plaintext 106 of FIG. 1. Process 600 may, for example, operate within NDE 102 of FIG. 1.

Process 600 begins, after a start block, at block 602 when a cursor position is received. The cursor position provides a starting position within the n-dimensional entity. The number of received coordinates may be employed to indicate the dimensions (N) of the n-dimensional entity. For example, a received cursor position of (10, 123, 99, 666, 0) indicates that the n-dimensional entity has a dimension of five. In one embodiment, another input may be received that specifies the number of dimensions, N.

The process proceeds to block 604 where the plaintext to be encoded is received. Optionally, at block 604, the length of the plaintext, in bits, may also be received. The length of the plaintext may also be determined by any of a variety of mechanisms, such as performing a bit count on the received plaintext. Process 600 continues block 606 where a user seed is received.

Process 600 continues next to block 608 where the n-dimensional entity is generated. Block 608 is described in more detail in conjunction with FIG. 7. Briefly, however, the received user seed and is employed in part to seed random number generator pRAND1. Output of pRAND1 is then employed to create and populate the n-dimensional entity with pseudo-randomly generated bits.

The process continues to block 610, where the received cursor position is normalized to ensure that the cursor position is within the boundaries of the n-dimensional entity. Normalization of the received cursor position may be achieved by any of a variety of mechanisms. In one embodiment a circular orbiting algorithm is employed that is similar to a screen display, or printer logic cursor normalization approach, as applied to N planes rather than the traditional two planes.

The present invention however is not limited to normalizing the cursor position to within the boundaries. For example, in one embodiment, the n-dimensional entity may acquire texture on its edges. Hence, in one embodiment, textures may arise by allowing dynamic lengthening of a bit wide plane to accommodate a cursor movement rather than an orbit. In this manner, a determination may navigate the edges of the n-dimensional entity and thereby, such extra-dimensional movement may affect subsequent movement.

The process proceeds next to block 612, where an obfuscation table is generated. The obfuscation table is generated with an element for each of the possible op-codes to be generated. The obfuscation table may be populated with pseudo-random numbers generated from a pseudo-random number generator. The pseudo-random number generator may be pRAND1, or another pseudo-random number generator, pRAND2, or the like. It is noted that employing the obfuscation table is optional and need not be included.

Process 600 continues to block 614, where the plaintext is bitwise encoded using the n-dimensional entity that was generated at block 608. Block 614 is described in more detail below in conjunction with FIG. 8. Briefly, however, an offset from a cursor position within the n-dimensional entity is determined by performing a search for a match to each bit within the plaintext. The offset and direction of the search are employed to modify a truly random sequence. Each modified truly random sequence is exclusively or-ed with a previously modified truly random sequence to generate the encoded array.

The process continues to block 616 where each exclusively or-ed sequence within the encoded array may be optionally exclusively or-ed with its corresponding element in an obfuscation table. In one embodiment, additional raw bits are added to each sequence in the encoded array to further obfuscate the output. Upon completion of block 616, the process ends. In one embodiment of the present invention, upon completion of block 616, the n-dimensional entity is destroyed.

Figure 7:
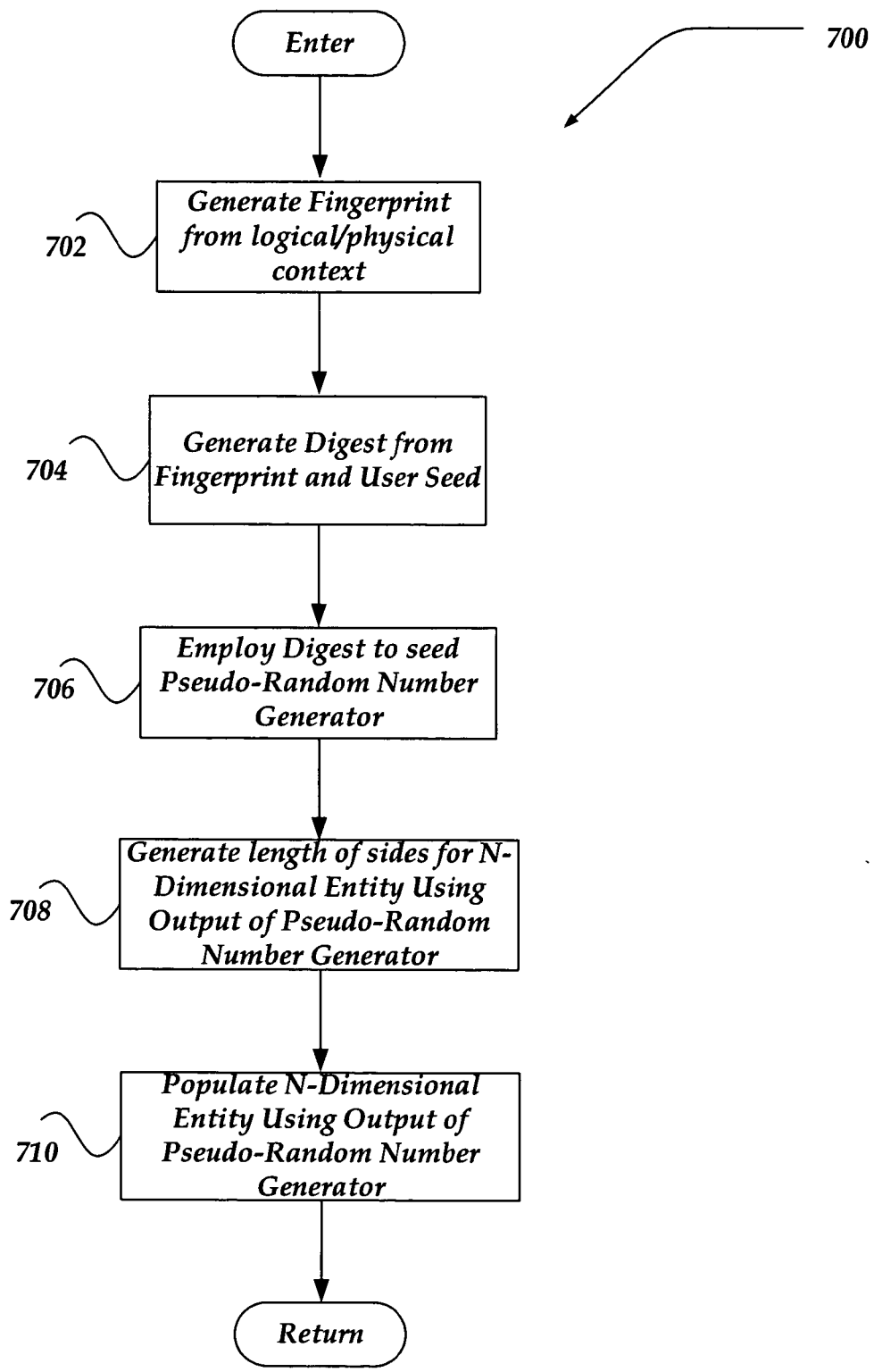
FIG. 7 illustrates a flow diagram showing one embodiment for a process of generating the n-dimensional entity.

FIG. 7 illustrates a flow diagram showing one embodiment for a process of generating the n-dimensional entity. Process 700 may, for example, operate within entity generator 112 of FIG. 1.

Process 700, begins, after a start block, at block 702, where a fingerprint is generated from a logical and/or physical context of the computing system in which the present invention operates. One or more unique and/or identifiable elements associated with the computer system are hashed employing any of a variety of hashing mechanisms, including but not limited to SHA-1. The resulting digest(s) may be hashed again to generate a single fingerprint.

The process continues to block 704, where the user seed and fingerprint are combined. In one embodiment, the user seed and fingerprint are added together. The combination is then hashed to generate another digest using any of a variety of hashing mechanisms. The process continues to block 706, where this other digest is employed to seed the pseudo-random number generator, pRAND1.

The process continues to block 708, where a length (the number of bits) is determined for each side of the n-dimensional entity. Each length may be set based on a pseudo-random number that is generated by the pseudo-random number generator. In one embodiment, the pseudo-random number generator employed is pRAND1. In one embodiment, each length is limited to 1K bits per side.

Upon completion of block 708, processing continues to block 710, where the n-dimensional entity is populated with pseudo-random numbers from at least one of the pseudo-random number generators. In one embodiment, pRAND1 is employed to populate the n-dimensional entity. Upon completion of block 708, processing returns to perform other actions.

Figure 8:
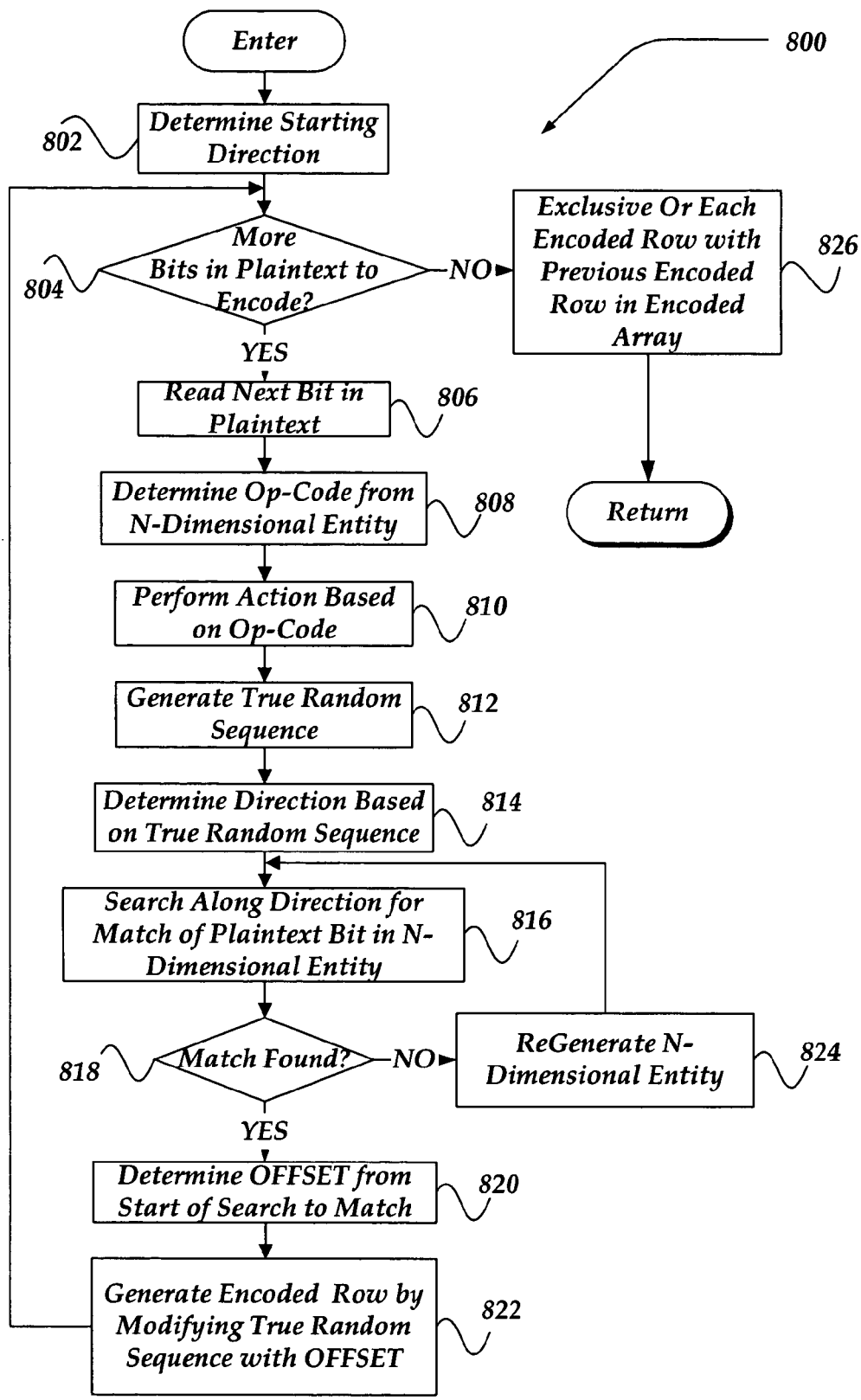
FIG. 8 illustrates a flow diagram showing one embodiment for a process of employing the n-dimensional entity to encode bits in the data string.

FIG. 8 illustrates a flow diagram generally showing one embodiment for a process of employing the n-dimensional entity to encode each bit within the plaintext. Process 800 operates to encode each bit into a sequence of bits, as described in conjunction with FIG. 3. Process 800 may operate within mapper 116 of FIG. 1.

Process 800, begins, after a start block, at block 802 when a starting direction is determined. The starting plane direction may be determined in a variety of approaches, including being provided as a user selectable input, as a default value, and the like.

Processing continues to decision block 804 where a determination is made whether there are more bits within the plaintext to encode. If there are no more bits to encode, processing branches to block 826 where additional obfuscation of the encoded array may be performed. If there are more bits to encode, processing continues to block 806, where the next bit in the plaintext is read.

Processing continues at block 808 where an op-code is determined from the n-dimensional entity. Starting at the current cursor position, bits are read along the current direction from within the n-dimensional entity. The number of bits that are read is equal to the size of the op-code. In one embodiment, the op-code size is 16 bits, however, the op-code size is not so constrained. For example, the op-code size may be a user selectable input. Process 800 continues next to block 810.

At block 810, the read number of bits is employed as an index into an op-code action table to determine an associated action to be performed. Associated actions are described in more detail in conjunction with FIG. 4. Briefly, however, associated actions may include, but are not limited to, using the read number of bits as a number of bits to move the cursor position along a selected plane, abandoning the current n-dimensional entity and employing another n-dimensional entity, flipping the state of an ON bit in the n-dimensional entity to OFF and the state of an OFF bit to ON, and the like.

Upon performing the associated action, processing continues to block 812, where an op-code size of truly random sequence of bits is generated. The generated truly random sequence is used to populate the row in the encoded array corresponding to the current bit position in the plaintext.

Processing proceeds to block 814 where the PLANE-MEMBER in the current row of the encoded array is employed to determine a direction. Additionally, a NEW-ENTITY bit within the current row of the encoded array is zeroed (set OFF).

Processing continues at block 816, where a search is performed along the direction determined at block 814 until a bit is located within the n-dimensional entity that matches the current plaintext bit.

Some op-code's actions performed at block 810 may reverse the state of the current plaintext bit to search for, reverse the state of the bits in the n-dimensional entity, or the like. However, the search performed at block 816 is configured to accommodate such changes. For example, if the op-code's actions reversed the states of the bits, then if current plaintext bit is set ON, the bit being searched for within the n-dimensional entity is an OFF bit.

Process 800 continues at decision block 818, where a determination is made whether a match has been located. If a match is located, processing branches to block 820; otherwise, processing branches to block 824.

At block 824, if no match is located at block 816, then the current cursor position, or the like, is employed to seed a pseudo-random number generator, such as pRAND3. A new n-dimensional entity may also be generated employing a process substantially similar to process 700 of FIG. 7. Additionally, the NEW-ENTITY bit in the current row of the encoded array is set high (ON) to indicate that a new n-dimensional entity is generated for this row. Processing loops back to 816 to continue the search for a match to the current plaintext bit.

At block 820, if a match is located at block 816, an offset count is determined by counting the number of bits between the current cursor position and the located matching bit within the n-dimensional entity.

Processing continues at block 822, where the offset count is placed into the current row of the encoded array at location OFFSET by overwriting any bits that may currently reside in that location. Processing branches back to decision block 804, where the above process is substantially repeated until there are no more bits in the plaintext to encode.

At decision block 804, when there are no more bits within the plaintext to be encoded, processing continues to block 826. At block 826, each row in the encoded array may be exclusively or-ed with the previous row in the encoded array. The first row in the encoded array may be exclusively or-ed with the last row of the encoded output.

Additionally, at block 804 each element in the obfuscation table created at block 612 of FIG. 6 is exclusively or-ed with its corresponding row in the encoded array.

Additional mechanisms may be employed to further obfuscate the encoding of the plaintext at block 804. In one embodiment additional rows of pseudo-random bits are appended to the encoded array. In another embodiment, each row, selection of rows, and the like, is extended in length by adding bits, such as pseudo-random bits. Removing pseudo-random bits may also be performed to shorten each row, selection of rows, and the like. Upon completion of block 826, the n-dimensional entity may be destroyed, and processing returns to perform other actions.

Figure 9:
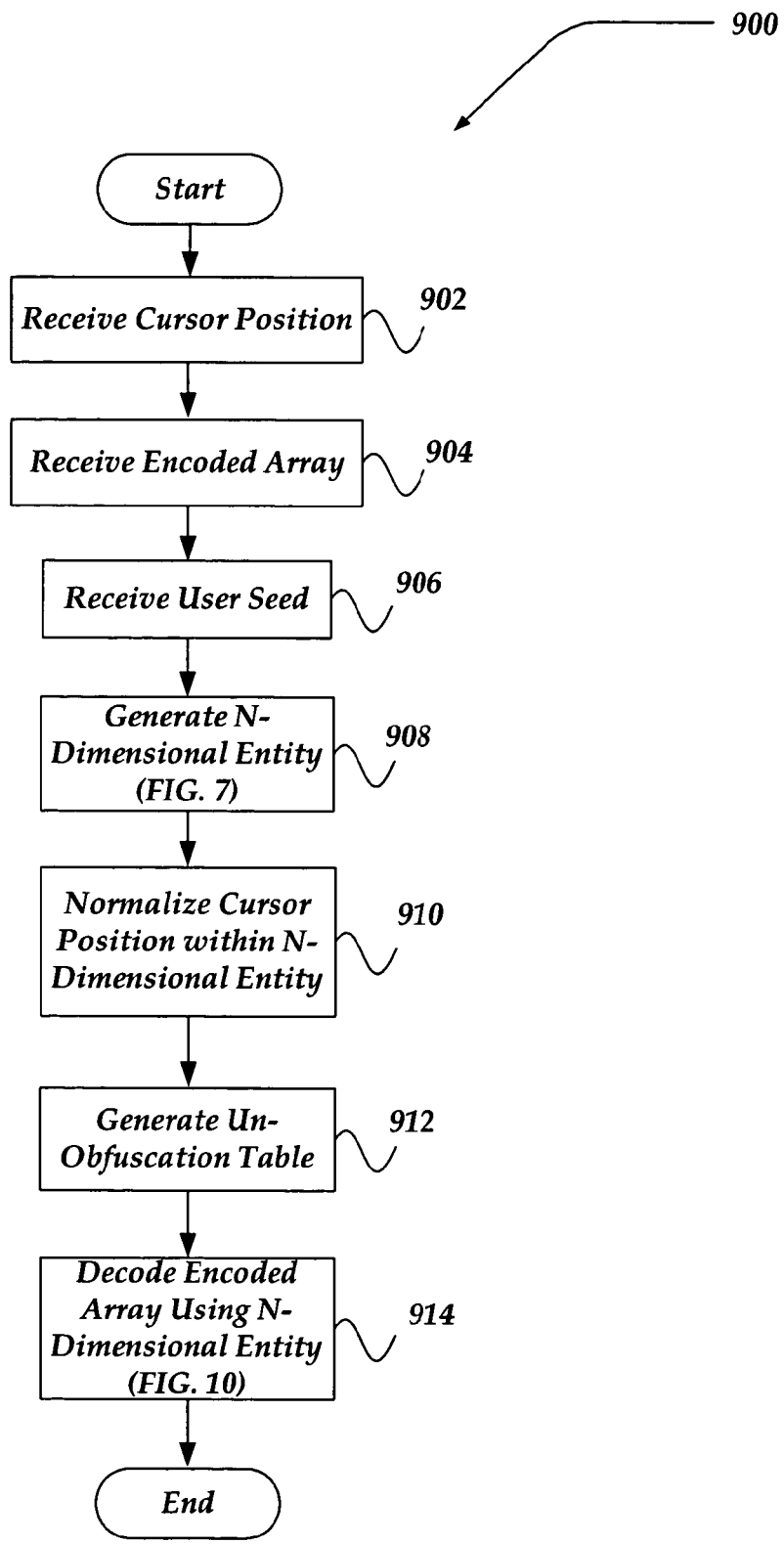
FIG. 9 illustrates a flow diagram generally showing one embodiment for a process of decrypting an encoded array.

FIG. 9 illustrates a flow diagram generally showing one embodiment for a process of decrypting an encoded array, such as is generated by process 800 in FIG. 8. Process 900 may, for example, operate within NDE 102 of FIG. 1.

Process 900 begins, after a start block, where the same initial cursor position is received that was received at block 602 of FIG. 6. In addition, at block 902, the size of the op-code that was employed to encode the plaintext may also be received.

Processing continues to block 904, where the encoded array is received that were generated from a substantially similar process to process 600 of FIG. 6. Processing proceeds to block 906, where the same user seed is received as was provided at block 606 of FIG. 6.

Processing continues to block 908, which is described in more detail above in conjunction with FIG. 7. Briefly, at block 908 an n-dimensional entity is generated that is the same as the n-dimensional entity that was generated at block 608 of FIG. 6.

Process 900 flows next to block 910, where the current cursor position is normalized to within the boundaries of the n-dimensional entity generated at block 908. Normalization may employ substantially the same mechanisms as described above at block 610 of FIG. 6.

Processing continues to block 912 where an optional un-obfuscation table is generated. The optional un-obfuscation table is generated with an element for each of the output op-codes to be generated. The un-obfuscation table is populated with pseudo-random bits that may be generated from pRAND2, such that the resulting un-obfuscation table is identical to the obfuscation table generated at block 616 of FIG. 6.

Processing proceeds to block 914, which is described in more detail below at FIG. 10. Briefly, at block 914, the n-dimensional entity generated at block 908 is employed to decode the encoded array into plaintext. Upon completion of block 914, process 900 ends.

Figure 10:
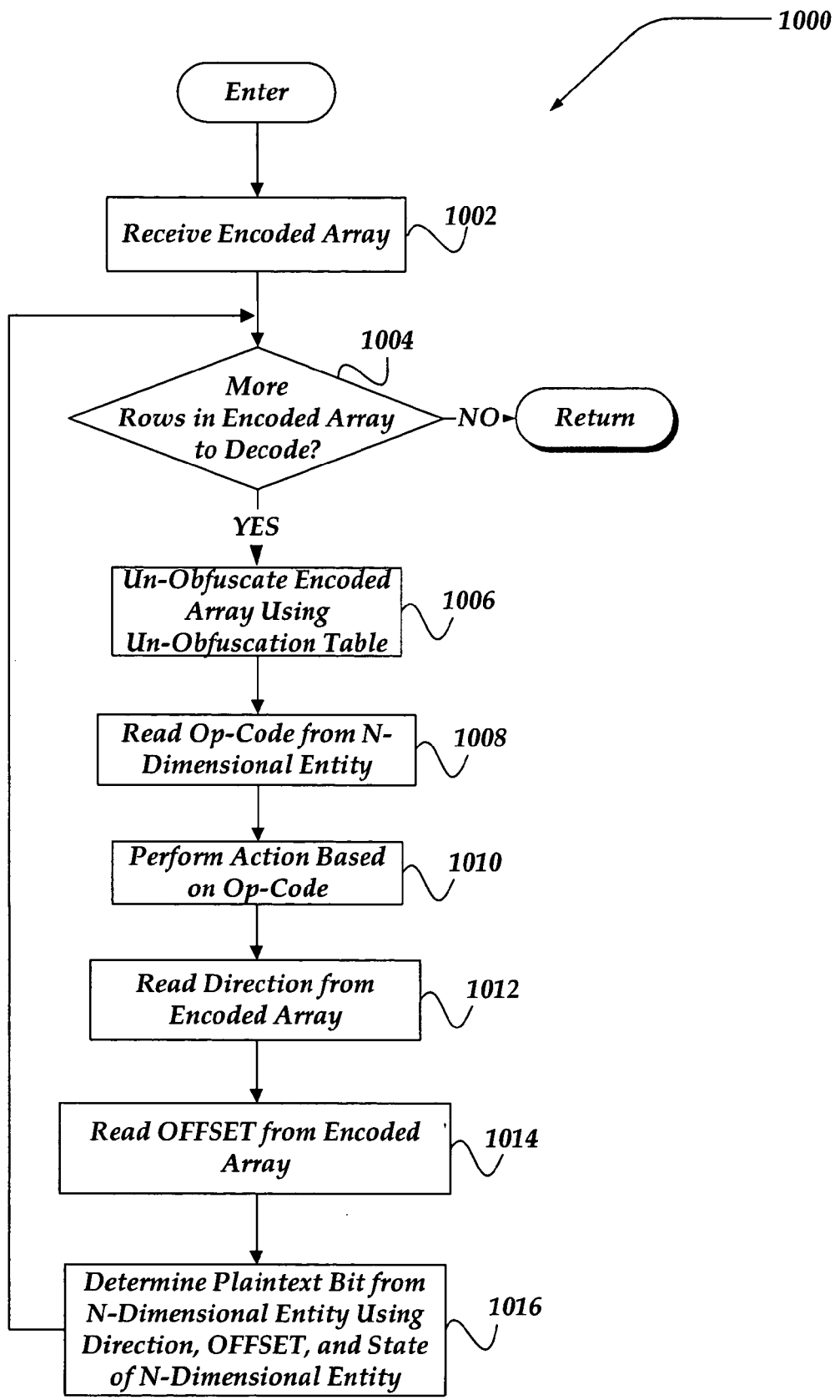
FIG. 10 illustrates a flow diagram showing one embodiment for a process of employing the n-dimensional entity to decode bits in the data string, in accordance with the present invention.

FIG. 10 illustrates a flow diagram showing one embodiment for a process of employing the n-dimensional entity to decode the encoded array. Process 1000 may, for example, operate within mapper 116 of FIG. 1.

Process 1000 begins, after a start block, at block 1002 where the encoded array that is to be decoded is received. Processing proceeds next to decision block 1004, where a determination is made whether there are more rows in the encoded array to decode. If there are more rows, processing branches to block 1006: otherwise, processing returns to perform other actions.

At block 1006, the un-obfuscated table is exclusively or-ed with encoded array. The first row in the encoded array is exclusively or-ed with the last row in the encoded array.

Processing continues next to block 1008, where starting at the current cursor position, a number of bits equal to the op-code size are read along the current direction of the n-dimensional entity.

Processing proceeds to block 1010, where the number of bits read are used as an index into the op-code action table to locate an op-code action. The op-code action is then performed. As in FIG. 8 at block 810, a variety of actions may be performed, including, but not limited to, creating a new cursor position, changing a bit state to search for from ON to OFF or vice versa, changing a direction to search for a bit, creating a new seed from which to generate a new n-dimensional entity for use in a subsequent action, and the like. Processing continues next to block 1012.

At block 1012, the current row in the encoded array is read to obtain the PLANE-MEMBER. The PLANE-MEMBER is used as the current direction of movement within the n-dimensional entity. Processing continues to block 1014, where the OFFSET is also read from the current row in the encoded array. Processing proceeds to block 1016, where the PLANE-MEMBER, OFFSET and State of the n-dimensional entity are used to fetch the plaintext bit from the n-dimensional entity. The final state of the plaintext bit may be adjusted per the current bit state that may have been set by a preceding op-code action. That is, the plaintext bit fetched from the n-dimensional entity may be used as is or more actually represent the opposite of the bit found for the plaintext. In any event, the final bit is then set at the current location within the plaintext. Upon completion of block 1016, processing loops back to decision block 1004, until there are no more rows to be decoded from the encoded array. Processing then returns to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus for encrypting a data string, comprising:
a transceiver that receives the data string and sends an encoded array; and
coupled to the transceiver, an n-dimensional encrypter that is arranged to perform actions, comprising:
receiving the data string;
selecting a direction within an n-dimensional entity based in part on a generated bit sequence;
determining an offset count by counting the number of bits between a cursor position within the n-dimensional entity and a match bit within the n-dimensional entity, wherein the match bit is located within the n-dimensional entity based in part on the direction and a bit in the received data string;
modifying the generated bit sequence with the determined offset count to generate an encoded data string, wherein the encoded data string represents a row within the encoded array; and
storing the encoded array as an encoded representation of the received data string.

2. The apparatus of claim 1, wherein determining the offset count between the cursor position and the match bit further comprises performing a search within the n-dimensional entity to locate a match to the bit in the data string.

3. The apparatus of claim 1, wherein the encrypter is arranged to perform actions, further comprising:
reading a number of bits from the n-dimensional entity;
performing an action associated with the n-dimensional entity based in part on the read number of bits; and
further basing the match bit location on the performed action.

4. The apparatus of claim 1, wherein the encrypter is arranged to perform actions, further comprising:
interpreting a sequence of bits from the n-dimensional entity as an op-code; and
determining, based on the op-code, one of a plurality of actions associated with the n-dimensional entity.

5. The apparatus of claim 1, wherein the encrypter is arranged to perform actions, further comprising:
combining the encoded data string associated with the bit in the data string with another encoded data string associated with a different bit in the data string, wherein the combination represents rows within the encoded array.

6. The apparatus of claim 1, wherein generating the n-dimensional entity further comprises determining a fingerprint associated with a context in which the apparatus operates.

7. A method of encrypting a data string, comprising:
generating an n-dimensional entity in part based on a fingerprint associated with a context of a computing system;
receiving the data string;
selecting a direction within the n-dimensional entity based in part on a generated bit sequence;
determining an offset count by counting the number of bits between a cursor position within the n-dimensional entity and a match bit within the n-dimensional entity, wherein the match bit is based in part on the direction and a bit in the data string;
modifying the generated bit sequence with the determined offset count to generate an encoded data string; and
storing the encoded data string as an encoded representation of at least a portion of the received data string.

8. The method of claim 7, wherein the offset count is determined from the cursor position by performing a search within the n-dimensional entity to locate a match to the bit in the data string.

9. The method of claim 7, wherein the offset count is a count determined between the cursor position and the match bit within the n-dimensional entity by counting the number of bits between the current cursor position and a matching bit located within the n-dimensional entity.

10. The method of claim 7, further comprising:
reading a number of bits from the n-dimensional entity; and
performing an action associated with the n-dimensional entity based in part on the read number of bits.

11. The method of claim 7, further comprising:
interpreting a sequence of bits from the n-dimensional entity as an op-code; and
determining, based on the op-code, one of a plurality of actions associated with the n-dimensional entity.

12. The method of claim 7, further comprising:
combining the encoded data string associated with the bit in the data string with another encoded data string associated with a different bit in the data string.

13. The method of claim 7, wherein the context for which the fingerprint further comprises at least one of a logical or a physical context in which the computing system operates.

14. A system for encrypting a data string, comprising:
one or more memory devices that store an n-dimensional entity, and an n-dimensional encrypter; and
a processor having a mapper component arranged to perform actions, comprising:
receiving the data string;
selecting a direction within the n-dimensional entity based in part on a randomly generated bit sequence;
determining an offset count by counting the number of bits between a cursor position within the n-dimensional entity and a match bit within the n-dimensional entity, wherein the match bit is based in part on the direction and the each bit in the data string;
modifying the generated bit sequence with the determined offset count to generate an encoded data string; and
storing the encoded data string as at least a partial encrypted representation of the received data string.

15. The system of claim 14, wherein the offset count is determined from the cursor position by performing a search within the n-dimensional entity to locate a match to the bit in the data string.

16. The system of claim 14, wherein the mapper is arranged to perform actions, further comprising:
reading a number of bits from the n-dimensional entity; and
performing an action associated with the n-dimensional entity based in part on the read number of bits.

17. The system of claim 14, wherein the mapper is arranged to perform actions, further comprising:
interpreting a sequence of bits from the n-dimensional entity as an op-code; and
determining based on the op-code, one of a plurality of actions associated with the n-dimensional entity.

18. The system of claim 14, wherein the mapper is arranged to perform actions, further comprising:
combining the encoded data string associated with the bit in the data string with another encoded data string associated with a different bit in the data string.

19. The system of claim 14, wherein the n-dimensional entity is generated based on a fingerprint associated with a context in which the system operates.

20. A non-transitory computer readable storage medium having computer-executable instructions stored thereon, which when executed by at least one processor, causes the at least one processor to perform one or more actions to encrypt a data string, comprising:
- receiving the data string;
- generating an n-dimensional entity based in part on a logical or physical context in which the at least one processor operates;
- selecting a direction within the n-dimensional entity based in part on a generated bit sequence;
- determining an offset count by counting the number of bits between a cursor position within the n-dimensional entity and a match bit within the n-dimensional entity, wherein the match bit within the n-dimensional entity is located based in part on the selected direction and a bit in the data string;
- modifying the generated bit sequence with the determined offset count to generate an encoded data string; and
- providing the encoded data string in part as a encrypted representation of the received data string.

* * * * *